US009304199B2

(12) United States Patent
Kreitmair-Steck et al.

(10) Patent No.: US 9,304,199 B2
(45) Date of Patent: Apr. 5, 2016

(54) OBSTACLE AND TERRAIN WARNING RADAR SYSTEM FOR A ROTORCRAFT

(71) Applicant: AIRBUS HELICOPTERS DEUTSCHLAND GMBH, Donauworth (DE)

(72) Inventors: Wolfgang Kreitmair-Steck, Munich (DE); Richard Scheiblhofer, Munich (DE)

(73) Assignee: AIRBUS HELICOPTERS DEUTSCHLAND GMBH, Donauworth (DE)

( * ) Notice: Subject to any disclaimer, the term of this patent is extended or adjusted under 35 U.S.C. 154(b) by 231 days.

(21) Appl. No.: 14/100,580

(22) Filed: Dec. 9, 2013

(65) Prior Publication Data

US 2014/0292556 A1    Oct. 2, 2014

(30) Foreign Application Priority Data

Dec. 10, 2012   (EP) .................................. 12400052

(51) Int. Cl.
*G01S 13/93* (2006.01)
*G01S 13/94* (2006.01)
(Continued)

(52) U.S. Cl.
CPC ............. *G01S 13/9303* (2013.01); *G01S 13/93* (2013.01); *G01S 13/94* (2013.01); *G01S 2013/9082* (2013.01)

(58) Field of Classification Search
CPC ..... G01S 13/88; G01S 13/93; G01S 13/9303; G01S 13/94; G01S 13/89; G01S 13/90; G01S 13/9035; G01S 2013/9082; G01S 13/74; G01S 13/76; G01S 13/762; G01S 7/48; G01S 7/51; G01S 13/9023; G01S 13/91; G01S 13/913; H01Q 1/27

USPC ........ 342/25 R–25 F, 27–29, 59, 61–65, 175, 342/195, 36, 73, 89, 94, 118, 146, 147, 30, 342/158; 340/945, 946; 343/700 R, 705
See application file for complete search history.

(56) References Cited

U.S. PATENT DOCUMENTS 3,611,376 A * 10/1971 Gutleber ............... G01S 13/913
                                                                342/94
3,761,930 A *  9/1973 Bennett ................... G01S 13/76
                                                                342/30

(Continued)

FOREIGN PATENT DOCUMENTS

DE         4328573       3/1995
DE      102006037898     3/2008

(Continued)

OTHER PUBLICATIONS

Waanders et al. European Rotocraft Forum, Sep. 4-7, 2012, 9 pages, "Miniaturized and Low-Cost Obstacle Warning System."

(Continued)

*Primary Examiner* — Bernarr Gregory
(74) *Attorney, Agent, or Firm* — Brooks Kushman P.C.

(57) ABSTRACT

Obstacle and terrain warning radar system (1) for a rotorcraft (2), the system having at least two assemblies (10), each having at least one radar unit, said rotorcraft (2) including at least one main rotor (20) having at least two blades (22) and a rotor head (23). Each radar unit transmits a centrifugal radar beam (17) with angular beam width in azimuth α of at least 5° and beam width in elevation ε of at least 5°. Said assemblies (10) of at least one radar unit are positioned directly on said rotor head (23) between said blades (22), said radar system (1) electronically scanning the surroundings with angular coverage in elevation of at least +/−15° and mechanically scanning the surroundings with angular coverage in azimuth of 360°, and then informing the pilot of said rotorcraft (2).

8 Claims, 6 Drawing Sheets

(51) Int. Cl.
  *G01S 13/00* (2006.01)
  *G01S 13/90* (2006.01)

(56) References Cited

U.S. PATENT DOCUMENTS

| | | | | |
|---|---|---|---|---|
| 3,896,446 A * | 7/1975 | Kondoh | ............... | H01Q 1/27 343/705 |
| 4,638,315 A * | 1/1987 | Raven | ............... | G01S 13/9035 342/25 F |
| 4,737,788 A * | 4/1988 | Kennedy | ............... | G01S 13/93 342/29 |
| 5,017,922 A * | 5/1991 | Klausing | ............... | G01S 13/9035 342/25 F |
| 5,093,649 A * | 3/1992 | Johnson | ............... | G01S 13/9035 342/147 |
| 5,371,581 A * | 12/1994 | Wangler | ............... | G01S 7/51 340/946 |
| 5,379,041 A * | 1/1995 | Klausing | ............... | G01S 13/9035 342/25 F |
| 5,381,152 A * | 1/1995 | Klausing | ............... | G01S 13/9035 342/25 F |
| 5,392,047 A * | 2/1995 | Klausing | ............... | G01S 13/9035 342/25 F |
| 5,451,957 A | 9/1995 | Klausing | | |
| 5,614,907 A | 3/1997 | Kreitmair-Steck et al. | | |
| 5,777,573 A * | 7/1998 | Klausing | ............... | G01S 13/9035 342/25 F |
| 6,054,947 A * | 4/2000 | Kosowsky | ............... | G01S 13/9035 342/25 A |
| 6,509,862 B2 * | 1/2003 | Klausing | ............... | G01S 13/9035 342/25 R |
| 6,549,159 B1 * | 4/2003 | Wolframm | ............... | G01S 13/9023 342/25 R |
| 6,577,264 B1 * | 6/2003 | Wolframm | ............... | G01S 13/9035 342/25 R |
| 7,002,508 B2 * | 2/2006 | Wolframm | ............... | G01S 13/9023 342/25 A |
| 7,463,183 B2 | 12/2008 | Reich | | |
| 7,479,920 B2 * | 1/2009 | Niv | ............... | G01S 13/89 342/29 |
| 7,868,817 B2 * | 1/2011 | Meyers | ............... | G01S 13/9303 342/36 |
| 7,898,462 B2 * | 3/2011 | Meyers | ............... | G01S 13/9303 342/29 |
| 9,213,096 B2 * | 12/2015 | Kreitmair-Steck | . | G01S 13/9303 |
| 2013/0128258 A1 | 5/2013 | Glad | | |

FOREIGN PATENT DOCUMENTS

| | | |
|---|---|---|
| DE | 102006053354 | 5/2008 |
| JP | 4276583 | 6/2009 |
| WO | WO92/07282 A1 * | 4/1992 |
| WO | 2011136707 | 11/2011 |

OTHER PUBLICATIONS

Extended European Search Report for EP 12400052.2, Completed by the European Patent Office on Apr. 26, 2013, 7 pages.

* cited by examiner

OBSTACLE AND TERRAIN WARNING RADAR SYSTEM FOR A ROTORCRAFT

CROSS REFERENCE TO RELATED APPLICATION

This application claims priority to European patent application No. EP 12 400052.2 filed Dec. 10, 2012, the disclosure of which is incorporated in its entirety by reference herein.

BACKGROUND OF THE INVENTION (1) Field of the Invention

The present invention relates to the technical field of radar detection systems. The present invention relates to an obstacle and terrain warning radar system for a rotorcraft and in particular for use in poor visibility due specifically to weather conditions.

(2) Description of Related Art

One of the main causes of rotorcraft accidents nowadays is contact while in flight with obstacles or indeed with the surrounding terrain. In particular, under unfavorable weather conditions or when flying at night, the risk of an accident is increased. Consequently, there is a major need for a warning system that enables the pilot of the rotorcraft to be alerted to the presence of one or more obstacles in the surroundings near to the rotorcraft, and also to the proximity of terrain. Such a warning system thus serves to avoid making contact with obstacles and terrain, if any, by warning the pilot of the rotorcraft. Such a warning system must be based on radar technology that is effective and reliable, and that is capable of guaranteeing such detection regardless of weather conditions.

Document DE 4 328 573 describes an all-weather vision system for a helicopter combining information coming from a rotating synthetic aperture radar (ROSAR) type radar with flight and navigation information in order to provide the pilot with artificial vision of the surroundings. That radar has transmitter and receiver elements situated on the rotor head of the helicopter and at the ends of a plurality of arms forming antennas, each positioned between a pair of blades of the main rotor. Those transmitter and receiver elements rotating with the main rotor are fastened on a central structure such as a turnstile and they are protected from aerodynamic forces and bad weather by a cover. However, the radar assembly presents heavy weight located above the main rotor, and also significant aerodynamic drag. In addition, as it is based on the synthetic aperture radar principle that all-weather vision system uses technology that is very complex and requires a powerful computer to handle the received data as well as to perform the rotating synthetic aperture algorithms.

In addition, document DE 10-2006/053354 describes a panoramic vision system for a helicopter having a plurality of radar sensors positioned at different locations on the helicopter fuselage in order to be capable of scanning the surroundings of the helicopter. The radar sensors operate with short-range and long-range wavelengths in order to, on the one hand, scan zones behind and beside the helicopter and, on the other hand, zones situated in front of the helicopter. The signals from those radar sensors are delivered to an evaluation and detection unit, and then the system displays the signals after they have been processed on display means situated in the cockpit, and information is compared with a predetermined warning threshold value. Each radar sensor needs to perform two-dimensional scanning, which requires complex antennas for performing electronic scanning in two dimensions. In addition, such a system requires numerous different sensor positions and an installation process that is complex.

Also known is document WO 2011/136707 that describes a laser obstacle detection and warning system for helicopters. That system emits laser light and receives laser light reflected by any obstacles located close to the helicopter. The system has a sensor unit having a plurality of obstacle detection sensors positioned on the rotor head of the helicopter and rotating with the main rotor, and also a warning unit and means for communicating between the sensor unit and the warning unit. The emitted laser light covers a sector volume around the axis of rotation of the main rotor. In that system, it is necessary for the laser to scan the surroundings mechanically in the vertical direction during high-speed rotation of the main rotor. However, that mechanism is prone to defects and has significant probability of failure. It consequently requires regular maintenance. Another drawback is that the laser presents a beam that is narrow and unsuitable for covering large areas.

Document U.S. Pat. No. 5,451,957 discloses a ROSAR system where the radar units are a plurality of antennae located at the end of a rotating arm (a blade or a turnstile), and wherein the scanning in elevation is carried out by the changeable orientation of the antennae. This system does therefore comprise movable parts that make it less reliable and robust.

Document DE 102006037898 describes a ROSAR system with a plurality of antennae, each antenna located at the tip of a rotor blade and having a different vertical orientation. Document U.S. Pat. No. 5,614,907 relates to a ROSAR radar sensor in which the transmit/receive antennae are located at the ends of the support arms of a turnstile.

Document "Miniaturized and low cost obstacle warning system" discloses a radar warning system wherein the aperture distribution of the radar, both in the azimuth and in the elevation direction, is achieved by using digital beam-forming techniques.

Finally, document JP 4 276 583 describes a system for detecting obstacles at long range by means of a laser and for use on helicopters. A laser source and receiver are placed on the shaft for driving rotation of the main rotor of a helicopter, the laser source emitting a spot beam of laser light and the receiver receiving the light reflected by any obstacle. On the rotary shaft, a position coder serves to determine the direction of a detected obstacle. That obstacle detection system is limited, enabling obstacles to be detected only in an azimuth direction around the axis of rotation of the main rotor of the helicopter and is therefore incapable of detecting obstacles in a height position, i.e. above or below the helicopter. In addition, since it uses a laser, it is subject to the same drawbacks as WO 2011/136707.

BRIEF SUMMARY OF THE INVENTION

The object of the invention is thus to provide an obstacle and terrain warning radar system for a rotorcraft that is robust and reliable, thereby obviating the above-mentioned limitations. The radar system must naturally enable obstacles and nearby terrain to be detected under difficult weather conditions, e.g. fog, rain, or snowfall, and also in particular lighting conditions, such as the external surroundings being very dark, or on the contrary the pilot of the rotorcraft being dazzled.

In addition, in order to guarantee reliability, such a radar system must not contain any mechanically movable parts in order to limit the risk of failure and breakdown. Furthermore, in order to be effective, the warning radar system must be capable of scanning the surroundings through 360° horizontally around the rotorcraft and over at least +/−15° vertically.

According to the invention, an obstacle and terrain warning radar system for a rotorcraft has a plurality of radar units. The rotorcraft has a fuselage and at least one main rotor with an axis of rotation, at least two blades, and a rotor head. The rotor head constitutes the central portion of the main rotor, located above the fuselage and including the hub of the main rotor and any element that is constrained to rotate with the hub, the hub driving said blades of the main rotor in rotation. Each radar unit transmits a radar beam and receives a signal reflected by any obstacle encountered by the radar beam. With its radar beam, each radar unit presents angular beam width in azimuth $\alpha$ of at least 5° and angular beam width in elevation $\epsilon$ of at least 5°.

The elevation direction corresponds to the direction of the axis of rotation of the main rotor. The angular coverage of a radar unit is constituted by the zone scanned by the radar beam of the radar unit. More particularly, angular coverage in elevation of a radar unit is constituted by the zone scanned by its radar beam in a plane containing the elevation direction, i.e. containing the axis of rotation of the main rotor, whereas its angular coverage in azimuth is constituted by the zone scanned by its radar beam in a plane perpendicular to said elevation direction, i.e. perpendicular to the axis of rotation of the main rotor.

The radar system is remarkable in that it has at least two assemblies, each having at least one radar unit, the assemblies being positioned directly on the rotor head between the blades of the main rotor and being regularly distributed about the axis of rotation of the main rotor. Each radar unit transmits a centrifugal (i.e. outwardly-directed) radar beam and the radar system scans the surroundings around the rotorcraft with angular coverage in elevation of at least +/−15° and angular coverage in azimuth via rotation with the rotor of 360°.

For example, such a radar system may scan the surroundings of the rotorcraft with angular coverage in elevation of at least +/−30°, or even at least +/−60°.

Since the radar units are placed on the rotor head, they rotate together with the main rotor. As a result, these radar units transmit respective centrifugal radar beams that scan mechanically as a result of the main rotor rotating, thereby scanning the surroundings of the rotorcraft over 360° about the axis of rotation of the main rotor, i.e. in azimuth. In contrast, the radar units are stationary relative to the main rotor. The radar units therefore perform scanning in elevation electronically in order to scan the surroundings of the rotorcraft in this direction. This angular coverage in elevation of the radar system of the invention is limited firstly by the angular coverage of each radar unit, and secondly by the coverage in elevation of all the radar units of the radar system together.

The radar system of the invention thus contains no movable parts, with the radar unit rotating together with the main rotor of the rotorcraft. This reduces the risk of such parts being damaged or broken in operation. This also makes it possible to reduce maintenance operations, and consequently reduces the associated maintenance cost.

Furthermore, each assembly may have a plurality of radar units that are positioned one beside another around the axis of rotation of the main rotor, and looking in different azimuth positions in order to avoid interference of the signals.

Depending on the number of radar units positioned in each subassembly, the obstacle and terrain warning radar system can increase its scanning rate in elevation relative to the revolution speed of the rotor. Given there is a complete scan in elevation after one revolution provided each assembly consists of one radar unit, then there might be a complete scan in elevation already after a quarter of revolution, given each assembly contains four radar units.

Furthermore, two centrifugal radar beams from two adjacent radar units are separated by an angle η of at least 1° in azimuth, i.e. around the axis of rotation of the main rotor. This separation zone serves to avoid having any intersection between two adjacent radar beams, thereby avoiding any interference between two radar beams and providing better detection accuracy. The separation zone without any radar beam is of no hindrance in terms of detecting any obstacles and terrain since it is covered by the mechanical scanning performed by the radar units as a result of the main rotor rotating.

In contrast, there is no need for a separation zone between two centrifugal radar beams of two adjacent radar units in the elevation direction, because the beams are already separated in azimuth.

In addition, each radar unit performs an electronic scan over its angular coverage during a predetermined length of time. As a result, the radar system of the invention can easily be configured, in particular the number of radar units and their positions can be configured, in such a manner that after at least one revolution of the main rotor, the radar system has performed a scan that is complete both in elevation and in azimuth of the surroundings around the rotorcraft.

The radar system preferably has at least as many assemblies as there are rotor blades, each having at least one radar unit, the assemblies being positioned between the blades or on top of the rotor head of the main rotor in order to perform this complete scan.

The total number k of radar units in the radar system of the invention may vary in practice from the number of blades of the main rotor up to ten times this number of blades, in particular in order to achieve good detection of obstacles and terrain with high update rates. Nevertheless, it is also possible to use a greater number of radar units, providing the total number k of radar units complies with the following formula:

$$k = nr \cdot q$$

where "q" is a coefficient such that:

$$nr \leq q \leq \frac{360°}{nr \cdot (\alpha + \eta)}$$

where "nr" is the number of blades of the main rotor, "α" is the angular coverage in azimuth of each radar unit, "η" is the angle separating two radar beams of two adjacent radar units in azimuth and "." is the symbol of the multiplication.

Nevertheless, regardless of the number k of radar units, it is important for the radar units to be positioned so that their radar beams do not intersect with the blades of the main rotor.

Furthermore, the radar system comprises a control and synchronization unit, an evaluation unit, an information transfer unit, a power transmission unit, and an obstacle and terrain warning instrument.

Each radar unit operates as an active unit, preferably such as a frequency modulated continuous wave (FMCW) system, receiving some minimum amount of information from the control and synchronization unit. The control and synchronization unit serves in particular to supply the control and synchronization information needed for each radar unit, such as the main rotor starting to rotate and also the direction and the speed of that rotation as well as a start marker for each 360° turn. Thus, each radar unit can determine the exact direction of the electronic scanning to be performed and can synchronize the electronic scans, both in azimuth and in elevation, amongst each of the radar units in order to ensure that the surroundings around the rotorcraft are scanned completely over at least one revolution of the main rotor. The control and synchronization unit also serves to synchronize the electronic scanning of two radar units that are adjacent in the elevation direction in order to avoid interference between their radar beams.

The data collected by each radar unit is then periodically transferred via the control and synchronization unit to the evaluation unit. The evaluation unit then evaluates this data and calculates the positions of any obstacles and terrain relative to the rotorcraft. Thereafter, the evaluation unit transfers information about these positions of the obstacles and terrain, if any, to the obstacle and terrain warning instrument. The obstacle and terrain warning instrument may for example comprise display means, such as a screen, situated in the cockpit of the helicopter, enabling the pilot of the rotorcraft to view the positions of these obstacles and terrain, if any.

Preferably, the control and synchronization unit and the evaluation unit are situated on the rotor head.

The information transfer unit serves to transfer information between the elements of the radar system of the invention located on the rotor head and rotating together with the main rotor to other elements of the radar system that are situated, for example, in the cockpit of the rotorcraft and that are not rotating with the main rotor. Thus, when the evaluation unit is situated on the rotor head, the information transfer unit serves to transfer information about the positions of obstacles and terrain relative to the rotorcraft, if any, coming from the evaluation unit rotating with the main rotor to the obstacle and terrain warning instrument that is situated in the cockpit of the rotorcraft.

The information transmission unit may use various known technologies for transferring information, e.g. signal transfer via a slip ring, inductive/capacitive signal transfer, or indeed wireless transmission of the WiFi® or Bluetooth® type.

Similarly, the electrical power needed for operating the radar system of the invention, and in particular the elements situated on the rotor head, may be transferred by the power transmission unit via slip rings or by inductive power transfer from a power generator present in the rotorcraft.

Under such conditions, the radar units make use of radar frequencies lying in the range 10 gigahertz (GHz) to 100 GHz, and provides good detection of obstacles and terrain under poor weather conditions, such as fog, rain, snowfall, and under particular lighting conditions, such as the external surroundings being very dark, or on the contrary the pilot of the rotorcraft being dazzled.

The radar units preferably use a radar frequency lying in the range 70 GHz to 80 GHz, which frequency is high enough to enable the radar units to be of small dimensions while also providing good detection of obstacles and terrain under such poor weather conditions and particular lighting conditions. In known manner, the use of high frequency makes it possible, in particular, to reduce the dimensions of the radar antenna of each radar unit, thus making it easier, in the context of the invention, to incorporate the unit in the rotor head of a rotorcraft.

The minimum range of the obstacle and terrain warning radar system, i.e. the minimum distance at which it is possible to detect an obstacle, is equal to or less than twice the diameter of the main rotor of the rotorcraft, and its maximum range is equal to at least 50 meters (m). In an embodiment of the invention, the maximum range may be greater than or equal to 250 m. The maximum range is preferably greater than or equal to 800 m.

Furthermore, the range resolution of the radar system of the invention, i.e. the accuracy with which distance is calculated to an obstacle or terrain, is less than or equal to 5 m. In an embodiment of the invention, this range resolution is less than or equal to 1 m. Preferably, this range resolution is less than or equal to 0.3 m. In addition, the accuracy with which the azimuth direction of detected obstacles is calculated is less than or equal to 5°.

BRIEF DESCRIPTION OF THE SEVERAL VIEWS OF THE DRAWINGS

The invention and its advantages appear in greater detail from the context of the following description of embodiments given by way of illustration and with reference to the accompanying figures, in which.

Elements present in more than one of the figures are given the same references in each of them.

It should be observed that three mutually orthogonal directions X, Y, and Z are marked in FIGS. 1 to 5.

The direction X is said to be "longitudinal" and the direction Y is said to be "transverse". These two directions X and Y are in a plane perpendicular to the axis of rotation of the main rotor of the rotorcraft, with the direction X being an axis of symmetry of the rotorcraft going from the front towards the rear of the rotorcraft. A third direction Z is said to be "in elevation" and it is parallel to the axis of rotation of the main rotor of the rotorcraft.

Figure 1:
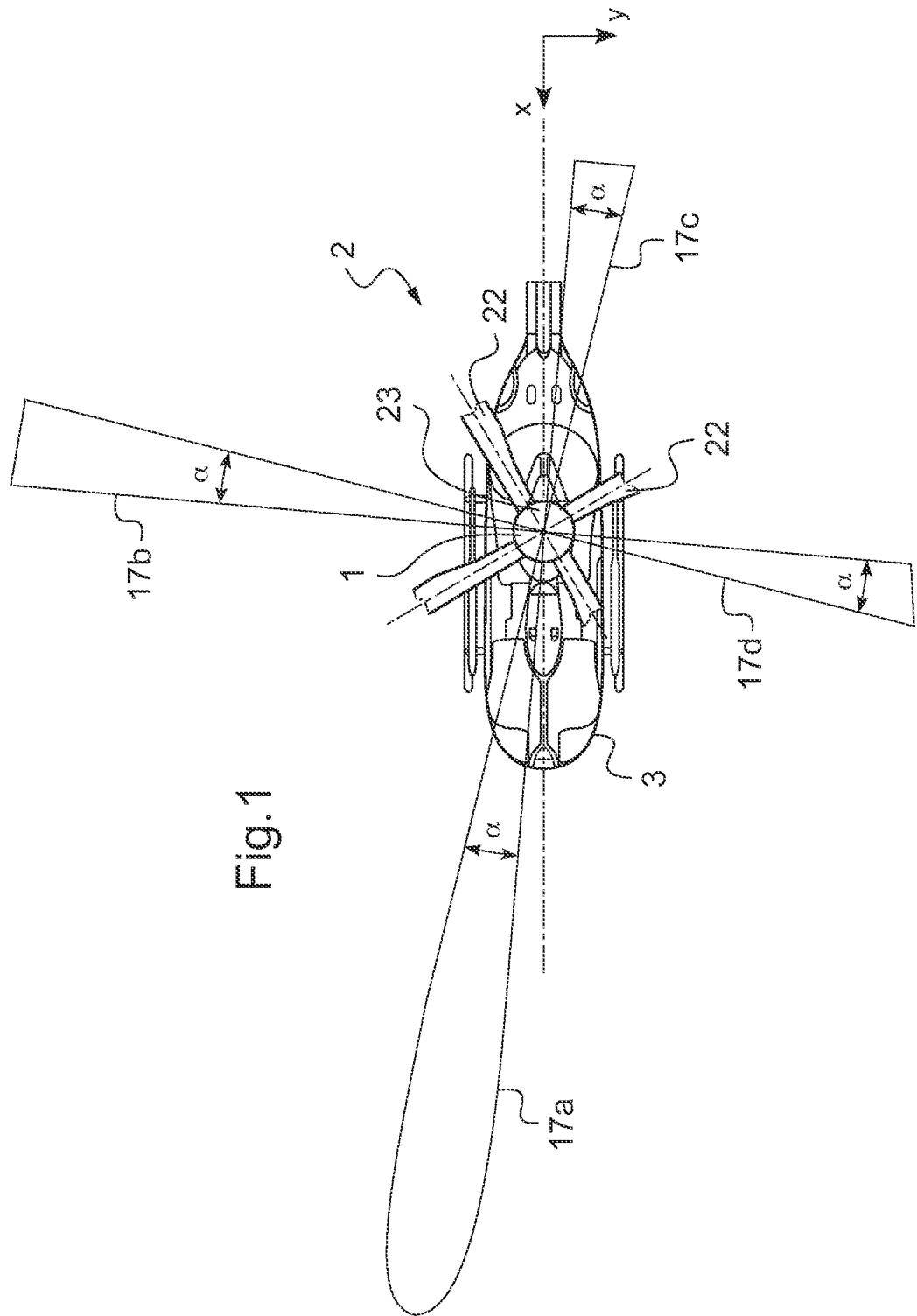
FIG. 1 is a plan view of a preferred embodiment of a radar system of the invention.
Figure 2:
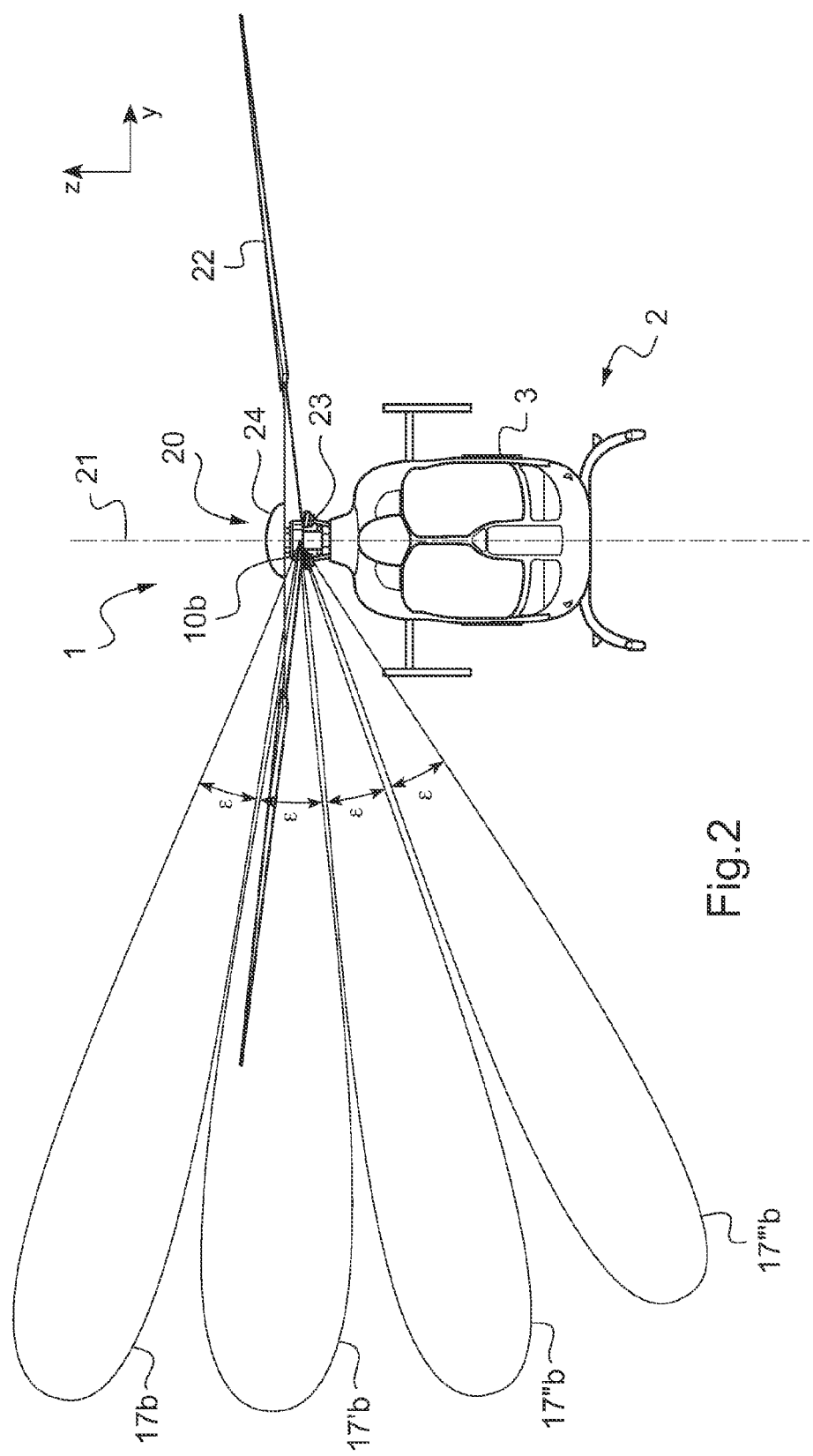
FIG. 2 is a front view of this preferred embodiment of a radar system of the invention.
Figure 3:
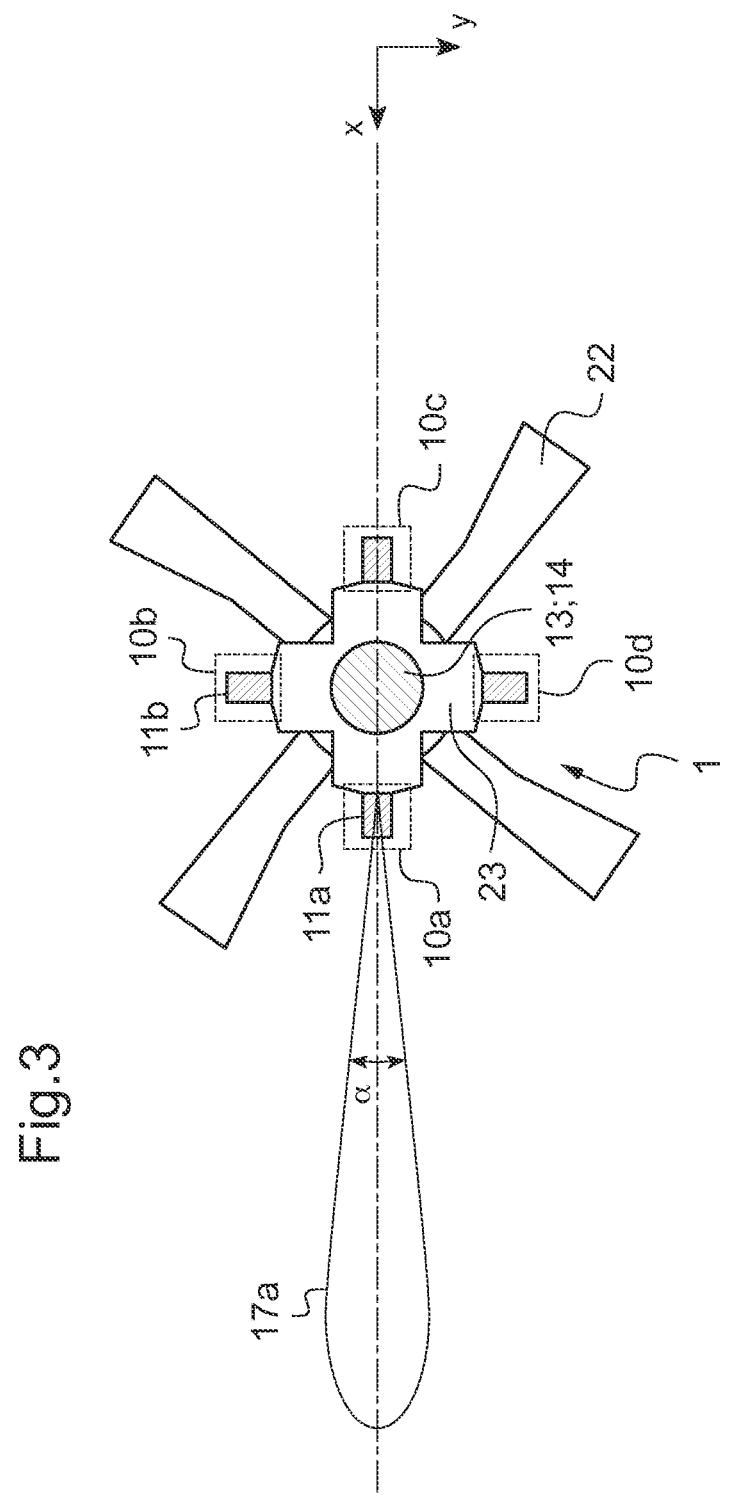
FIG. 3 shows a detail view of this preferred embodiment, in plan.

A preferred embodiment of the invention is shown in FIGS. 1 to 3, where FIG. 1 is a plan view, FIG. 2 is a front view, and FIG. 3 is a detail view of the plan.

DETAILED DESCRIPTION OF THE INVENTION

A rotorcraft 2 has a main rotor 20 and a fuselage 3, the main rotor 20 having an axis of rotation 21, four blades 22, a rotor head 23, and a cover 24. The rotor head 23 constitutes the central portion of the main rotor 20, above the fuselage 3, and it includes the hub of the main rotor 20 and all elements that are constrained to rotate with the hub, the hub driving the blades 22 of the main rotor 20 in rotation about the axis of rotation 21. An obstacle and terrain warning radar system 1 of the invention is positioned on and/or around the rotor head 23 of the rotorcraft 2.

The radar system 1 comprises a number of assemblies 10 that are positioned, as shown in FIG. 3, between pairs of blades 22, being regularly distributed around the axis of rotation 21. In a preferred variant of the invention, the exact number of assemblies 10 is equal to the number of rotor blades.

Each assembly 10 is positioned in the elevation direction between the blades 22, e.g. level with the dampers conventionally present on the main rotor 20, however these assemblies 10 may also be positioned above the blades 22, and more precisely between the blades 22 and the cover 24 covering the rotor head 23.

Each radar unit 11 transmits a centrifugal radar beam 17 and receives a signal reflected by any obstacle encountered by the radar beam 17. This radar beam 17 gives each radar unit 11 angular beam width in azimuth α of at least 5° and angular beam width in elevation ε of at least 5°, the angular coverage in azimuth of a radar unit 11 being constituted for example by the zone scanned by the radar beam 17 during the rotation around the axis of rotation 21.

Since the radar units 11 are placed and fixed mounted on the rotor head 23, they rotate together with the main rotor 20. As a result, these radar units 11 transmit respective centrifugal radar beams 17 that are mechanically scanning through the surroundings of the rotorcraft 2 over 360° about the axis of rotation 21 during one revolution of the main rotor 20. However, since each radar unit 11 is stationary relative to the main rotor 20, it is scanned in elevation electronically so that the radar system 1 scans the surroundings of the rotorcraft both in elevation and in azimuth.

The radar system 1 does not have any moving parts, with the radar units 11 being fixed mounted and only rotating with the main rotor 20 of the rotorcraft 2, thereby reducing risks of failure and consequently reducing the amount of maintenance required and its costs.

The angular coverage in elevation of the radar system 1 i.e. the electronic scanning angle is at least +/−15°. This angular coverage in elevation may be as great as +/−30°, or preferably at least +/60 achieved by increasing the angle of the electronic scan of the radar units.

Figure 4:
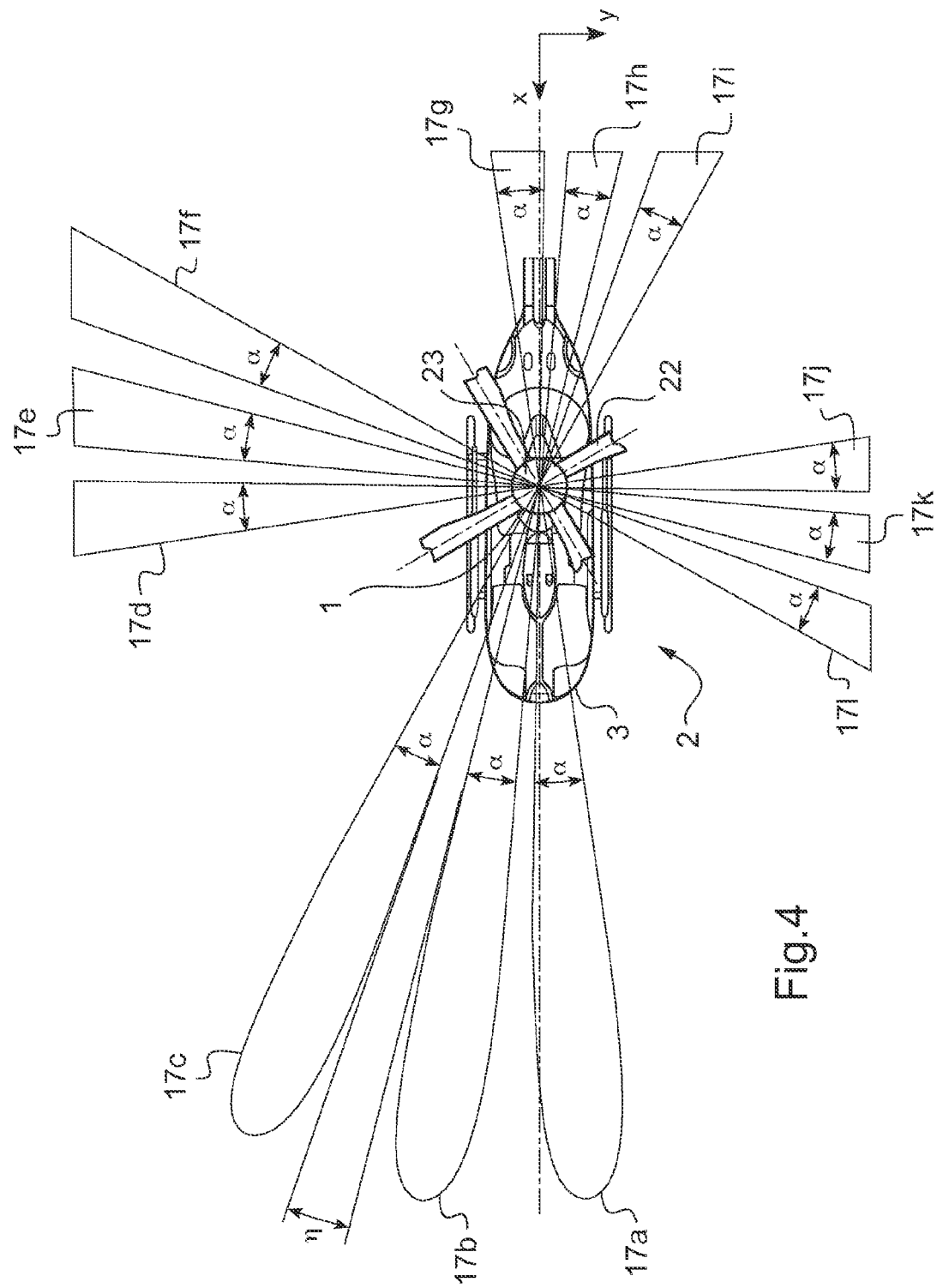
FIG. 4 is a plan view of a variant of the invention.
Figure 5:
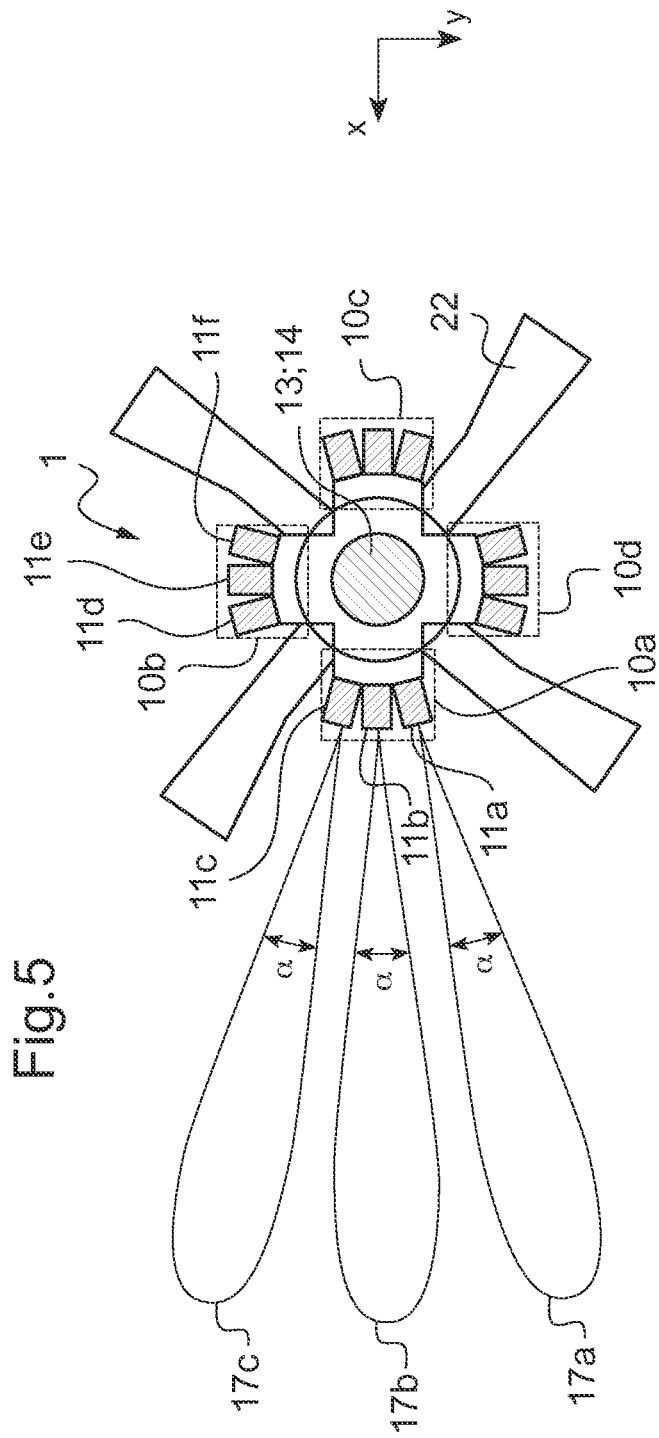
FIG. 5 is a detail of the plan view of this variant.

A variant of this preferred embodiment of the invention is shown in FIGS. 4 and 5, where FIG. 4 is a plan view and FIG. 5 is a detail of this plan view.

In this variant, each assembly 10 comprises three radar units 11a, 11b, and 11c situated side by side around the axis of rotation 21.

The centrifugal radar beams of the three radar units 11a, 11b, and 11c are spaced apart in a plane perpendicular to the axis of rotation 21 by an angle η of at least 1°, this spacing avoiding any interference between two adjacent radar beams.

The presence of three radar units 11a, 11b, and 11c for each assembly 10 in a plane perpendicular to the axis of rotation 21 makes it possible in particular to increase the update rate for the complete environmental scans of the overall radar system 1.

The distance resolution of the radar system 1 of the invention, i.e. the accuracy concerning the distance to detected obstacles and terrain is less than or equal to 5 m. This distance resolution may be less than or equal to 1 m, and is preferably less than or equal to 0.3 m. In addition, accuracy in calculating azimuth direction of a detected obstacle is depending on the azimuth beam width but it might be as low as 5°.

Using three radar units 11a, 11b, and 11c in each assembly 10 in a plane perpendicular to the axis of rotation 21 can also make it possible to increase the maximum range at which the radar system 1 of the invention can detect obstacles and terrain. By increasing the number of these radar units 11, it is possible to reduce the angular coverage of each radar unit 11 and to increase the maximum range of each radar unit 11, without thereby reducing the detection accuracy of the radar system 1.

For example, the minimum range of the obstacle and terrain warning radar system is at least equal to twice the diameter of the main rotor of the rotorcraft, and its maximum range is equal to at least 50 m. This maximum range may be greater than or equal to 250 m, and is preferably greater than or equal to 800 m.

Figure 6:
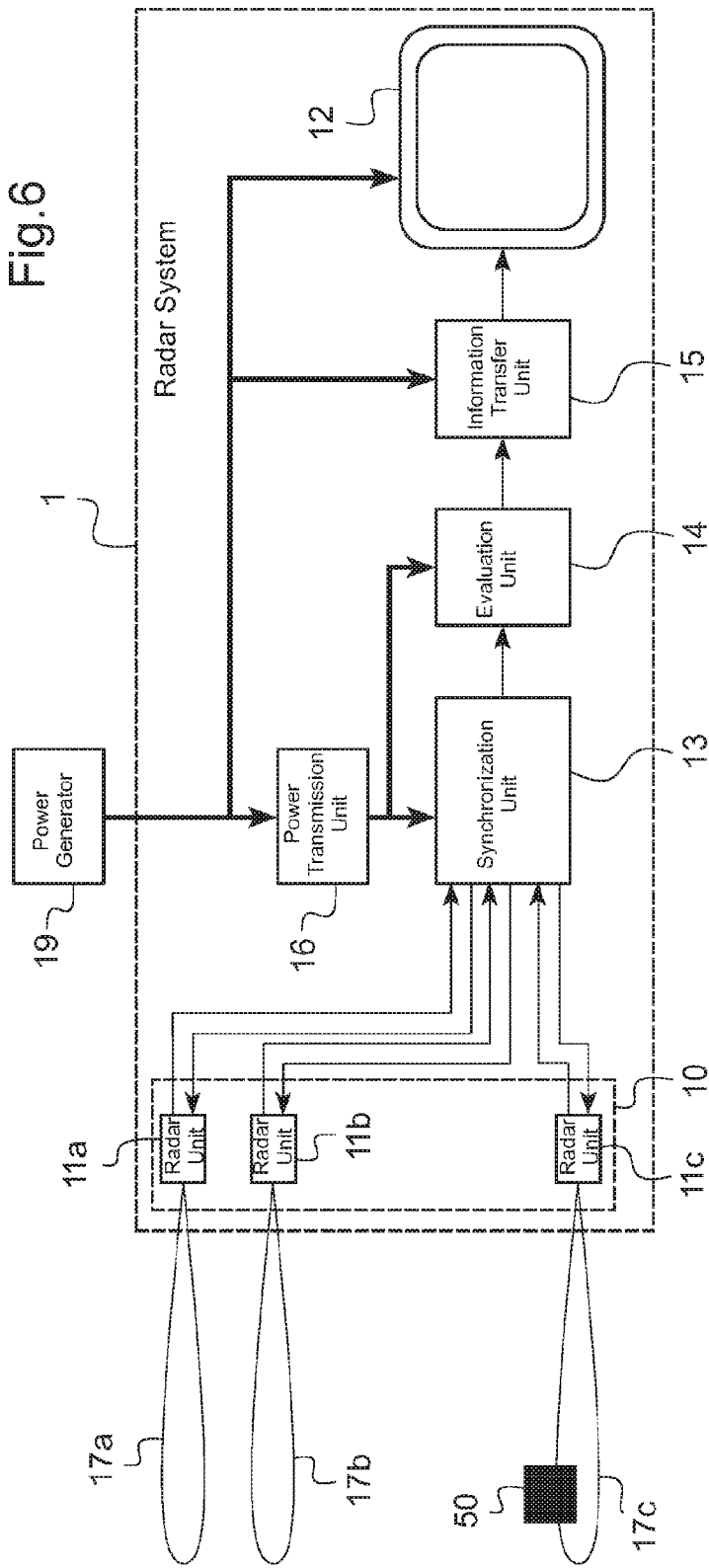
FIG. 6 shows an example of the architecture of a radar system of the invention.

FIG. 6 shows an example of architecture for a radar system 1 of the invention, which example is equally valid for the preferred embodiment and for the variant described with reference to FIGS. 4 and 5. This architecture comprises radar units 11, only one assembly 10 of three radar units 11a, 11b, and 11c being shown, a control and synchronization unit 13, an evaluation unit 14, an information transfer unit 15, a power transmission unit 16, and an obstacle and terrain warning instrument 12. The information transfer unit 15 and the power transmission unit 16 each consists of a fixed part in the fuselage and a moving part on the rotor head.

The control and synchronization unit 13 and the evaluation unit 14, the moving part of the information transfer unit 15 and the moving part of the power transmission unit 16 are preferably situated on the rotor head 23 of the main rotor 20, whereas the fixed part of the information transfer unit 15, the fixed part of the power transmission unit 16, as well as the obstacle and terrain warning instrument 12 are situated inside the fuselage 3 of the rotorcraft 2.

The control and synchronization unit 13 serve in particular to provide each radar unit 11 with control and synchronization information, such as the starting of rotation of the main rotor 20, the direction and the speed of this rotation and a start signal when starting a new 360° turn. Thus, each radar unit 10 can synchronize each electronic scan in elevation and in a plane perpendicular to said elevation direction in order to ensure that the surroundings around the rotorcraft 2 are scanned completely, e.g. over one revolution of the main rotor 20.

The control and synchronization unit 13 receives the data collected by each radar unit 11 and transfers that data to the evaluation unit 14. The evaluation unit 14 then evaluates this information and calculates the positions of any obstacles and terrain relative to the rotorcraft 2. Thereafter, the evaluation unit 14 transfers information concerning these positions of possible obstacles and terrain to the obstacle and terrain warning instrument 12. By way of example, this obstacle and terrain warning instrument 12 comprises display means, such as a screen, situated in the cockpit of the rotorcraft 2 and enabling the pilot of the rotorcraft 2 to visualize the positions of such obstacles and terrain, if any. For example, the radar beam 15c transmitted by the radar unit 11c detects an obstacle 50 with the presence and the angular position in elevation and azimuth as well as the range of that obstacle being delivered to the pilot by the obstacle and terrain warning instrument 12.

The information transfer unit 15 serves to transfer information from the evaluation unit 14 located on the rotor head 23 rotating with the main rotor 20 to the obstacle and terrain warning instrument 12 situated inside the fuselage 3 and thus not rotating with the main rotor 20.

This information transmission unit 15 may use various known technologies for transferring information, such as signal transfer via a slip ring, inductive/capacitive signal transfer, or indeed wireless transmission of the WiFi® or Bluetooth® type.

In addition, the electrical power needed for operating each element of the radar system 1 may be transferred by the power transmission unit 16 from a power generator 19 present in the rotorcraft 2, and in particular for the control and synchronization unit 13 and for the evaluation unit 14 situated on the rotor head 23, power transmission taking place via slip rings or by inductive power transfer. The information transfer unit 15 and the obstacle and terrain warning instrument 12 that are located inside the fuselage 3 of the rotorcraft 2 may be powered by the power transmission unit 16 or they may be powered directly by the power generator 19 present in the rotorcraft 2.

Naturally, the present invention may be subjected to numerous variations as to its implementation. Although several embodiments are described above, it will readily be understood that it is not conceivable to identify exhaustively all possible embodiments. It is naturally possible to envisage replacing any of the means described by equivalent means without going beyond the ambit of the present invention.

In particular, the number of radar units 11 in the radar system 1 used in the preferred embodiment and in the variant of this preferred embodiment, are not limiting. The total number k of radar units 11 in the radar system 1 may vary in practice from the number of blades 22 of the main rotor 20 up to ten times this number of blades 22. Nevertheless, a greater number of radar units 11 may also be used, providing the total number k of radar units 11 satisfies the following formula:

$$k=nr \cdot q$$

where "q" is a coefficient such that:

$$nr \leq q \leq \frac{360°}{nr \cdot (\alpha + \eta)}$$

where "nr" is the number of blades 22, "α" is the angular beam width in azimuth of each radar unit 11, "η" is the angle separating each radar beam 17 and each radar unit 11 in a plane perpendicular to the axis of rotation 21 "·" is the symbol of the multiplication.

What is claimed is:

1. An obstacle and terrain warning radar system for a rotorcraft, the system having a plurality of radar units, said rotorcraft having at least one main rotor with an axis of rotation, at least two blades, and a rotor head, each radar unit transmitting a radar beam with a beam width in azimuth α of at least 5° and a beam width in elevation ε of at least 5°, the elevation direction being along said axis of rotation of said main rotor, and a zone scanned in azimuth by said radar beam being in a plane perpendicular to said axis of rotation, the radar system comprising at least two assemblies positioned and fixed mounted in a regular manner around said axis of rotation directly on said rotor head between said blades, each assembly having at least one radar unit, each radar unit transmitting a centrifugal radar beam, said radar system scanning the surroundings around said rotorcraft electronically in elevation with an angular coverage of at least +/−15° and automatically in azimuth with an angular coverage of 360° during the rotation of the said main rotor.

2. A radar system according to claim 1, wherein said radar system has at least as many assemblies as there are rotor blades on the rotorcraft.

3. A radar system according to claim 1, wherein each assembly has at least two radar units positioned side by side around said axis of rotation of said main rotor.

4. A radar system according to claim 3, wherein two centrifugal radar beams from two adjacent radar units are separated by an angle 11 about said axis of rotation, in azimuth, of at least 1°.

5. A radar system according to claim 1, wherein said main rotor has a number nr of blades, and a total number k of radar units required is given by a formula:

$$k=nr \cdot q,$$

where "q" is a coefficient such that:

$$nr \leq q \leq \frac{360°}{nr \cdot (\alpha + \eta)},$$

"α" being an angular coverage in azimuth of each radar unit, "η" being an angle separating two radar beams of two radar units that are adjacent in azimuth and "·" being a symbol of a multiplication.

6. A radar system according to claim 1, wherein said radar system comprises a control and synchronization unit to supply control and synchronization information needed for each radar unit, an evaluation unit to evaluate data provided by each radar unit and to calculate positions of any obstacles and terrain relative to the said rotorcraft, an information transfer unit to transfer information between moving elements of the radar system and fixed elements of the radar system, a power transmission unit to provide electrical power, and an obstacle and terrain warning instrument to indicate positions of these obstacles and terrain on at least on display mean.

7. A radar system according to claim 1, wherein said radar system scans surroundings with an angular coverage in elevation of at least +/−30°.

8. A radar system according to claim 1, wherein said radar system scans surroundings with an angular coverage in elevation of at least +/−60°.

* * * * *